(12) United States Patent
Yoo et al.

(10) Patent No.: US 11,659,813 B2
(45) Date of Patent: May 30, 2023

(54) LIQUID DISPENSER FOR ANIMALS (71) Applicant: LG ELECTRONICS INC., Seoul (KR)

(72) Inventors: Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 686 days.

(21) Appl. No.: 16/571,076

(22) Filed: Sep. 14, 2019

(65) Prior Publication Data
US 2020/0085004 A1 Mar. 19, 2020

Related U.S. Application Data (60) Provisional application No. 62/733,393, filed on Sep. 19, 2018.

(30) Foreign Application Priority Data

Nov. 1, 2018 (KR) .......................... 10-2018-0132709
Jul. 4, 2019 (KR) .......................... 10-2019-0080604

(51) Int. Cl.
A01K 7/00 (2006.01)
A01K 7/02 (2006.01)

(52) U.S. Cl.
CPC .................................... A01K 7/025 (2013.01)

(58) Field of Classification Search
CPC . A01K 7/00; A01K 7/005; A01K 7/02; A01K 7/022; A01K 7/025; A01K 7/027; A01K 7/04; A01K 7/06; A01K 39/02; A01K 39/04; A01K 39/024; A01K 39/026
USPC .............................................. 119/51.5, 72–80
See application file for complete search history.

(56) References Cited

U.S. PATENT DOCUMENTS

| 1,218,969 | A | 3/1917 | Ziener |
| 1,243,126 | A | 10/1917 | Ziener |
| 1,512,629 | A | 10/1924 | Mueller et al. |
| 2,103,653 | A | 12/1937 | Weil |

(Continued)

FOREIGN PATENT DOCUMENTS

| CA | 2082083 | 5/1994 |
| CA | 2587229 | 5/2006 |

(Continued)

OTHER PUBLICATIONS

Chinese Office Action dated Mar. 30, 2021 issued in CN Application No. 201910886714.X.

(Continued)

Primary Examiner — Peter M Poon
Assistant Examiner — Danielle A Clerkley
(74) Attorney, Agent, or Firm — KED & Associates, LLP (57) ABSTRACT A pet water dispenser may include a water tank having a space to store water and an upper opening, a pump installed in the space, a water supply pipe to transfer water discharged from the pump, and a water supply plate to which water is supplied from the water supply pipe. The water tank may include a wall defining the space and a water tank base supporting the wall from below. An upper end of the wall may be smaller than a lower end of the wall, as the wall may be inclined inward from the lower end to the upper end.

15 Claims, 6 Drawing Sheets (56) References Cited

U.S. PATENT DOCUMENTS

| | | |
|---|---|---|
| 2,510,446 A | 6/1950 | Weil |
| 3,076,435 A | 2/1963 | Seymour |
| 3,303,824 A | 2/1967 | Anderson |
| 3,441,003 A | 4/1969 | Du Mond et al. |
| D221,755 S | 9/1971 | Johnson |
| 3,691,787 A | 9/1972 | Kaufmann |
| 3,765,614 A | 10/1973 | Bartl et al. |
| 4,100,885 A | 7/1978 | Kapplinger |
| 4,133,456 A | 1/1979 | Corini |
| 4,286,546 A | 9/1981 | Moore |
| 4,561,384 A | 12/1985 | Liff |
| 4,640,226 A | 2/1987 | Liff |
| 4,932,561 A | 6/1990 | Boxall |
| 5,031,689 A | 7/1991 | Jones et al. |
| 5,105,771 A | 4/1992 | Schafer |
| 5,140,134 A | 8/1992 | Reusche et al. |
| 5,174,245 A | 12/1992 | Bishop |
| 5,205,242 A | 4/1993 | Kasselman |
| 5,209,069 A | 5/1993 | Newnan |
| 5,345,063 A | 9/1994 | Reusche et al. |
| 5,601,199 A | 2/1997 | Marty |
| 5,699,669 A | 12/1997 | Gebhard |
| 5,782,094 A | 7/1998 | Freeman |
| 5,791,287 A | 8/1998 | Gruber |
| 5,799,609 A | 9/1998 | Burns et al. |
| 5,845,605 A | 12/1998 | Malamphy |
| 5,884,582 A | 3/1999 | Duckworth |
| 5,941,077 A | 8/1999 | Safyan |
| 6,003,318 A | 12/1999 | Busick |
| 6,230,653 B1 | 5/2001 | Tobin |
| 6,460,483 B1 | 10/2002 | Northrop et al. |
| 6,622,657 B2 | 9/2003 | Northrop et al. |
| 6,644,037 B2 | 11/2003 | Busick |
| 6,705,540 B2 | 3/2004 | Koshiyama et al. |
| 6,848,392 B1 | 2/2005 | Kreutzer, Jr. |
| 7,089,881 B2 | 8/2006 | Plante |
| 7,270,082 B2 | 9/2007 | Plante |
| 7,549,395 B2 | 6/2009 | Stenberg |
| 7,600,486 B2 | 10/2009 | Ellis |
| 7,743,698 B2 | 6/2010 | Muir et al. |
| 7,823,538 B1 | 11/2010 | Merager |
| 7,958,844 B1 | 6/2011 | Northrop |
| 8,117,991 B1 | 2/2012 | Civitillo |
| 8,210,447 B2 | 7/2012 | Cohen |
| 8,387,566 B2 | 3/2013 | Graves et al. |
| 8,770,147 B2 | 7/2014 | Rowe |
| 8,770,148 B2 | 7/2014 | Lipscomb et al. |
| 9,035,222 B2 | 5/2015 | Alexander |
| D738,579 S | 9/2015 | Owens et al. |
| D755,449 S | 5/2016 | Cornwell, Jr. et al. |
| 9,497,930 B2 | 11/2016 | Lipscomb et al. |
| D819,898 S | 6/2018 | Poisson et al. |
| 10,165,753 B1 | 1/2019 | Huang |
| 11,154,034 B2 | 10/2021 | Youn et al. |
| 11,160,250 B2 | 11/2021 | Yoo et al. |
| 2002/0020673 A1 | 2/2002 | Nohren et al. |
| 2003/0115902 A1 | 6/2003 | Busick et al. |
| 2003/0140864 A1 | 7/2003 | Wenstrand |
| 2003/0213437 A1 | 11/2003 | Norris |
| 2005/0166853 A1 | 8/2005 | Plante |
| 2006/0174838 A1 | 8/2006 | Plante |
| 2006/0231040 A1 | 10/2006 | Bast et al. |
| 2006/0288947 A1 | 12/2006 | Perlsweig et al. |
| 2007/0045159 A1 | 3/2007 | Lee |
| 2007/0095297 A1 | 5/2007 | Boyd |
| 2007/0199512 A1 | 8/2007 | Ellis |
| 2007/0227456 A1 | 10/2007 | Borey |
| 2008/0078330 A1 | 4/2008 | McCallum et al. |
| 2008/0169249 A1 | 7/2008 | Ter Stege |
| 2008/0190374 A1 | 8/2008 | Farris |
| 2008/0257272 A1 | 10/2008 | Bolda |
| 2009/0126641 A1 | 5/2009 | Anderson et al. |
| 2009/0218985 A1 | 9/2009 | Hallett |
| 2010/0095897 A1 | 4/2010 | Rowe |
| 2010/0276508 A1 | 11/2010 | Davies |
| 2010/0300366 A1 | 12/2010 | Lipscomb et al. |
| 2011/0067638 A1 | 3/2011 | Lipscomb et al. |
| 2011/0102945 A1 | 5/2011 | Isono et al. |
| 2011/0214613 A1 | 9/2011 | Diamond |
| 2011/0226470 A1 | 9/2011 | Latrille et al. |
| 2011/0259273 A1 | 10/2011 | Lipscomb et al. |
| 2012/0017839 A1 | 1/2012 | Veness et al. |
| 2012/0111280 A1 | 5/2012 | Shin et al. |
| 2012/0216751 A1 | 8/2012 | Rowe |
| 2013/0087102 A1 | 4/2013 | Lipscomb et al. |
| 2013/0092090 A1 | 4/2013 | McCallum |
| 2013/0175802 A1 | 7/2013 | Breau et al. |
| 2013/0192529 A1 | 8/2013 | Kruger et al. |
| 2013/0200064 A1 | 8/2013 | Alexander |
| 2013/0228132 A1 | 9/2013 | Lipscomb et al. |
| 2013/0255280 A1 | 10/2013 | Murphy et al. |
| 2014/0033984 A1 | 2/2014 | Li et al. |
| 2014/0053781 A1 | 2/2014 | Lewis |
| 2014/0076242 A1 | 3/2014 | Ho |
| 2014/0165607 A1 | 6/2014 | Alexander |
| 2014/0251223 A1 | 9/2014 | Rowe et al. |
| 2014/0353335 A1 | 12/2014 | Van Diepen |
| 2015/0135728 A1 | 5/2015 | Swanson et al. |
| 2015/0189862 A1 | 7/2015 | Lipscomb |
| 2015/0196157 A1 | 7/2015 | Swisth |
| 2015/0276204 A1 | 10/2015 | Ray |
| 2015/0313180 A1 | 11/2015 | Lipscomb et al. |
| 2015/0353335 A1 | 12/2015 | Breault |
| 2016/0000037 A1 | 1/2016 | Lipscomb et al. |
| 2016/0099599 A1 | 4/2016 | Ho et al. |
| 2016/0113249 A1 | 4/2016 | Kuo |
| 2016/0118179 A1 | 4/2016 | Park et al. |
| 2016/0159633 A1 | 6/2016 | Diffenderfer |
| 2016/0286757 A1 | 10/2016 | Armstrong |
| 2016/0287363 A1 | 10/2016 | Miller |
| 2017/0245465 A1 | 8/2017 | Oates et al. |
| 2017/0255186 A1 | 9/2017 | Ryznar et al. |
| 2018/0054073 A1 | 2/2018 | Olson et al. |
| 2018/0160648 A1 | 6/2018 | Goh |
| 2018/0177325 A1 | 6/2018 | Lyons et al. |
| 2019/0075755 A1 | 3/2019 | Imaizumi et al. |
| 2019/0140471 A1 | 5/2019 | Johanski et al. |
| 2019/0162460 A1 | 5/2019 | Oh |
| 2019/0227580 A1 | 7/2019 | von der Assen et al. |
| 2019/0239476 A1 | 8/2019 | Mai et al. |
| 2019/0239491 A1 | 8/2019 | Yu et al. |
| 2019/0357747 A1 | 11/2019 | Keiler, III |
| 2020/0303971 A1 | 9/2020 | Hall et al. |
| 2020/0337266 A1 | 10/2020 | Yu et al. |
| 2020/0355751 A1 | 11/2020 | Swaans et al. |

FOREIGN PATENT DOCUMENTS

| | | |
|---|---|---|
| CH | 711714 | 1/2022 |
| CN | 2322412 | 6/1999 |
| CN | 2351955 | 12/1999 |
| CN | 1701206 | 11/2005 |
| CN | 2776044 | 5/2006 |
| CN | 1870903 | 11/2006 |
| CN | 200994393 | 12/2007 |
| CN | 200994394 | 12/2007 |
| CN | 201365463 | 12/2009 |
| CN | 201422313 | 3/2010 |
| CN | 201530253 | 7/2010 |
| CN | 101790970 | 8/2010 |
| CN | 201541568 | 8/2010 |
| CN | 101816289 | 9/2010 |
| CN | 101841191 | 9/2010 |
| CN | 102072468 | 5/2011 |
| CN | 102480927 | 5/2012 |
| CN | 102600661 | 7/2012 |
| CN | 202310894 | 7/2012 |
| CN | 102934044 | 2/2013 |
| CN | 202722224 | 2/2013 |
| CN | 202873523 | 4/2013 |
| CN | 203136752 | 8/2013 |
| CN | 203544552 | 4/2014 |
| CN | 203618522 | 6/2014 |
| CN | 103917147 | 7/2014 |

(56) References Cited

FOREIGN PATENT DOCUMENTS

| | | |
|---|---|---|
| CN | 103931515 | 7/2014 |
| CN | 203913286 | 11/2014 |
| CN | 204707695 | 10/2015 |
| CN | 204722018 | 10/2015 |
| CN | 105265331 | 1/2016 |
| CN | 205005702 | 2/2016 |
| CN | 105792644 | 7/2016 |
| CN | 205431490 | 8/2016 |
| CN | 105923696 | 9/2016 |
| CN | 205682161 | 11/2016 |
| CN | 106172064 | 12/2016 |
| CN | 106212310 | 12/2016 |
| CN | 205830734 | 12/2016 |
| CN | 106332801 | 1/2017 |
| CN | 205884322 | 1/2017 |
| CN | 106787233 | 5/2017 |
| CN | 206142936 | 5/2017 |
| CN | 206227319 | 6/2017 |
| CN | 106962218 | 7/2017 |
| CN | 206314381 | 7/2017 |
| CN | 107041318 | 8/2017 |
| CN | 107124043 | 9/2017 |
| CN | 107259458 | 10/2017 |
| CN | 107509653 | 12/2017 |
| CN | 206699096 | 12/2017 |
| CN | 206760412 | 12/2017 |
| CN | 206760441 | 12/2017 |
| CN | 107568092 | 1/2018 |
| CN | 206851699 | 1/2018 |
| CN | 107660756 | 2/2018 |
| CN | 206949206 | 2/2018 |
| CN | 107821202 | 3/2018 |
| CN | 107897027 | 4/2018 |
| CN | 207268238 | 4/2018 |
| CN | 107969351 | 5/2018 |
| CN | 207411173 | 5/2018 |
| CN | 207443927 | 6/2018 |
| CN | 207519400 | 6/2018 |
| CN | 108271728 | 7/2018 |
| CN | 108353810 | 8/2018 |
| CN | 108377928 | 8/2018 |
| CN | 108464253 | 8/2018 |
| CN | 207740217 | 8/2018 |
| CN | 207803161 | 9/2018 |
| CN | 207870035 | 9/2018 |
| CN | 109513315 | 3/2019 |
| CN | 109997713 | 7/2019 |
| DE | 20 2016 107 252 | 3/2018 |
| EP | 0 894 430 | 2/1999 |
| EP | 1 188 995 | 3/2002 |
| EP | 1 566 099 | 8/2005 |
| EP | 3 315 022 | 5/2018 |
| EP | 3 520 607 | 8/2019 |
| FR | 2 726 452 | 5/1996 |
| GB | 2 458 173 | 9/2009 |
| GB | 2574921 | 12/2019 |
| JP | H05-118725 | 5/1993 |
| JP | H07-269800 | 10/1995 |
| JP | 2012-188163 | 10/2012 |
| JP | 3200546 | 10/2015 |
| JP | 2017-148018 | 8/2017 |
| JP | 2018-057340 | 4/2018 |
| KR | 10-0835557 | 6/2008 |
| KR | 10-2010-0046615 | 5/2010 |
| KR | 10-1116332 | 3/2012 |
| KR | 10-2013-0136123 | 12/2013 |
| KR | 10-2014-0042949 | 4/2014 |
| KR | 20-0475039 | 11/2014 |
| KR | 10-2017-0003154 | 1/2017 |
| KR | 10-2017-0017718 | 2/2017 |
| KR | 10-1825334 | 2/2018 |
| KR | 10-1898661 | 9/2018 |
| RU | 2650560 | 4/2018 |
| TW | 201641007 | 12/2016 |
| TW | I 574614 | 3/2017 |
| WO | WO 2009/016604 | 2/2009 |
| WO | WO 2010/138799 | 12/2010 |
| WO | WO 2011/035320 | 3/2011 |
| WO | WO 2013/012943 | 1/2013 |
| WO | WO 2014/209159 | 12/2014 |
| WO | WO 2017/185053 | 10/2017 |

OTHER PUBLICATIONS

European Search Report dated Feb. 27, 2020 issued in Application No. 19198292.5.
European Search Report dated Feb. 27, 2020 issued in Application No. 19198298.2.
European Search Report dated Apr. 23, 2020 issued in EP Application No. 19198303.0.
United States Office Action dated Feb. 11, 2022 issued in co-pending related U.S. Appl. No. 16/574,322.
Chinese Office Action issued in Application No. 201910887007.2 dated Apr. 20, 2021.
Chinese Office Action issued in Application No. 201910886974.7 dated Apr. 20, 2021.
Chinese Office Action issued in Application No. 201910886711.6 dated Apr. 20, 2021.
Chinese Office Action issued in Application No. 201910889081.8 dated Apr. 20, 2021.
Chinese Office Action issued in Application No. 201910888688.4 dated Apr. 21, 2021.
Chinese Office Action issued in Application No. 201910886539.4 dated Apr. 22, 2021.
Chinese Office Action issued in Application No. 201910889318.2 dated Apr. 22, 2021.
Chinese Office Action issued in Application No. 201910888721.3 dated Apr. 22, 2021.
Chinese Office Action issued in Application No. 201910888102.4 dated Apr. 26, 2021.
Chinese Office Action dated Nov. 10, 2021 issued in CN Application No. 201910886533.7.
Chinese Office Action dated Nov. 10, 2021 issued in CN Application No. 201910886714.X.
U.S. Appl. No. 16/574,259, filed Sep. 18, 2019.
U.S. Appl. No. 16/574,418, filed Sep. 18, 2019.
U.S. Appl. No. 16/571,090, filed Sep. 14, 2019.
U.S. Appl. No. 16/569,841, filed Sep. 13, 2019.
European Search Report dated Apr. 9, 2020 issued in EP Application No. 19198174.5.
United States Office Action dated Jun. 2, 2020 issued in co-pending related U.S. Appl. No. 16/574,259.
United States Office Action dated Mar. 24, 2022 issued in co-pending related U.S. Appl. No. 16/571,089.
Chinese Office Action issued in Application No. 201910888224.3 dated Apr. 12, 2021.
Chinese Office Action issued in Application No. 201910888611.7 dated Apr. 12, 2021.
Chinese Office Action issued in Application No. 201910888695.4 dated Apr. 16, 2021.
United States Office Action dated Apr. 27, 2021 issued in co-pending related U.S. Appl. No. 16/569,841.
United States Office Action dated Apr. 27, 2021 issued in co-pending related U.S. Appl. No. 16/574,418.
Dong, CN108464253A Machine Translation Description, Aug. 31, 2018, obtained Jan. 13, 2022 (Year: 2018).
United States Office Action dated Mar. 14, 2022 issued in co-pending related U.S. Appl. No. 16/570,310.
United States Office Action dated Mar. 17, 2022 issued in co-pending related U.S. Appl. No. 16/574,581.
European Search Report dated Feb. 14, 2020 issued in Application No. 19198187.7.
European Search Report dated Feb. 14, 2020 issued in Application No. 19198196.8.
European Search Report dated Feb. 19, 2020 issued in Application No. 19198191.9.
European Search Report dated Feb. 19, 2020 issued in Application No. 19198200.8.

(56) References Cited

OTHER PUBLICATIONS

United States Office Action dated May 11, 2021 issued in co-pending related U.S. Appl. No. 16/571,093.
European Search Report dated Apr. 17, 2020 issued in EP Application No. 19198180.2.
European Search Report dated Apr. 17, 2020 issued in EP Application No. 19198307.1.
European Search Report dated Apr. 20, 2020 issued in EP Application No. 19198310.5.
European Search Report dated Apr. 20, 2020 issued in EP Application No. 19198368.3.
European Search Report dated Feb. 3, 2020 issued in EP Application No. 19198170.3.
Chinese Office Action dated May 17, 2021 issued in CN Application No. 201910889361.9.
United States Office Action dated Dec. 6, 2021 issued in co-pending related U.S. Appl. No. 16/569,827.
United States Office Action dated Dec. 10, 2021 issued in co-pending related U.S. Appl. No. 16/571,075.
Chinese Office Action dated May 17, 2021 issued in CN Application No. 201910887029.9.
Chinese Office Action dated May 17, 2021 issued in CN Application No. 201910889360.4.
Chinese Office Action dated May 18, 2021 issued in CN Application No. 201910888671.9.
United States Office Action dated Mar. 30, 2021 issued in co-pending related U.S. Appl. No. 16/571,090.
European Search Report dated Feb. 24, 2020 issued in EP Application No. 19198289.1.
Chinese Office Action dated Mar. 31, 2021 issued in CN Application No. 201910886533.7.
Chinese Office Action dated May 10, 2021 issued in CN Application No. 201910888718.1.
Chinese Office Action dated May 21, 2021 issued in CN Application No. 201910888661.5.
United States Office Action dated Oct. 5, 2021 issued in co-pending related U.S. Appl. No. 16/571,074.
Chinese Office Action dated Apr. 1, 2021 issued in CN Application No. 201910886305.X.
Chinese Office Action dated Apr. 9, 2021 issued in CN Application No. 201910886526.7.
United States Office Action dated Feb. 1, 2022 issued in co-pending related U.S. Appl. No. 16/574,237.
European Search Report dated Feb. 3, 2020 issued in Application No. 19198173.7.
European Search Report dated Feb. 3, 2020 issued in Application No. 19198182.8.
European Search Report dated Feb. 3, 2020 issued in Application No. 19198183.6.
European Search Report dated Feb. 3, 2020 issued in Application No. 19198184.4.
European Search Report dated Feb. 3, 2020 issued in Application No. 19198186.9.
European Search Report dated Feb. 3, 2020 issued in Application No. 19198202.4.
European Search Report dated Feb. 10, 2020 issued in Application No. 19198265.1.
United States Office Action dated May 19, 2022 issued in co-pending related U.S. Appl. No. 16/569,827.
United States Office Action dated Jun. 1, 2022 issued in co-pending related U.S. Appl. No. 16/571,075.
United States Office Action dated Jun. 2, 2022 issued in co-pending related U.S. Appl. No. 16/570,279.
United States Office Action dated Jun. 15, 2022 issued in co-pending related U.S. Appl. No. 16/569,908.
United States Office Action dated Jun. 23, 2022 issued in co-pending related U.S. Appl. No. 16/574,368.
United States Office Action dated Jul. 5, 2022 issued in co-pending related U.S. Appl. No. 16/574,240.
United States Office Action dated Jul. 7, 2022 issued in co-pending related U.S. Appl. No. 16/574,474.
United States Office Action dated Jul. 29, 2022 issued in co-pending related U.S. Appl. No. 16/574,322.
United States Office Action dated Aug. 29, 2022 issued in co-pending related U.S. Appl. No. 16/571,245.
United States Office Action dated Sep. 19, 2022 issued in co-pending related U.S. Appl. No. 16/569,827.
Chinese Notice of Allowance dated Apr. 8, 2022 issued in CN Application No. 201910888611.7.
Chinese Notice of Allowance dated Jul. 11, 2022 issued in CN Application No. 201910886305.X.
Chinese Notice of Allowance dated Aug. 31, 2022 issued in CN Application No. 201910889318.2.
Chinese Office Action dated Sep. 21, 2022 issued in CN Application No. 201910888224.3.
U.S. Appl. No. 16/574,240, filed Sep. 18, 2019.
U.S. Appl. No. 16/574,312, filed Sep. 18, 2019.
U.S. Appl. No. 16/574,349, filed Sep. 18, 2019.
U.S. Appl. No. 16/571,075, filed Sep. 14, 2019.
U.S. Appl. No. 16/571,073, filed Sep. 14, 2019.
U.S. Appl. No. 16/570,310, filed Sep. 13, 2019.
U.S. Appl. No. 16/569,908, filed Sep. 13, 2019.
United States Office Action dated Oct. 11, 2022 issued in co-pending related U.S. Appl. No. 16/570,279.
United States Office Action dated Oct. 13, 2022 issued in co-pending related U.S. Appl. No. 16/571,089.
United States Office Action dated Feb. 23, 2023 issued in co-pending related U.S. Appl. No. 16/574,322.
Rao et al. (2015). Effect of Corrugation Angle on Heat Transfer Studies of Viscous Fluids in Corrugated Plate Heat Exchangers. International Journal of Engineering and Technology Innovation, 5(2), pp. 99-107. (Year: 2015).
U.S. Office Action dated Mar. 30, 2023 issued in U.S. Appl. No. 16/574,368.
United States Office Action dated Mar. 3, 2023 issued in co-pending related U.S. Appl. No. 16/574,474.
U.S. Appl. No. 16/574,219 filed Sep. 18, 2019.
U.S. Appl. No. 16/574,237 filed Sep. 18, 2019.
U.S. Appl. No. 16/574,322 filed Sep. 18, 2019.
U.S. Appl. No. 16/574,368 filed Sep. 18, 2019.
U.S. Appl. No. 16/574,474 filed Sep. 18, 2019.
U.S. Appl. No. 16/574,581 filed Sep. 18, 2019.
U.S. Appl. No. 16/571,245 filed Sep. 16, 2019.
U.S. Appl. No. 16/571,093 filed Sep. 14, 2019.
U.S. Appl. No. 16/571,089 filed Sep. 14, 2019.
U.S. Appl. No. 16/571,076 filed Sep. 14, 2019.
U.S. Appl. No. 16/571,074 filed Sep. 14, 2019.
U.S. Appl. No. 16/570,279 filed Sep. 13, 2019.
U.S. Appl. No. 16/569,827 filed Sep. 13, 2019.

LIQUID DISPENSER FOR ANIMALS

CROSS-REFERENCE TO RELATED APPLICATION(S)

This application claims priority under 35 U.S.C. § 119 to U.S. Provisional Application No. 62/733,393 filed on Sep. 19, 2018, and Korean Application Nos. 10-2019-0080604 filed on May 24, 2019, and 10-2018-0132709 filed on Nov. 1, 2018, whose entire disclosure(s) is/are hereby incorporated by reference.

BACKGROUND

1. Field

A liquid dispenser to supply liquid to an animal, e.g., a pet, is disclosed herein.

2. Background

In recent years, the population of people raising a pet has increased, in addition attachment and interest in pets. Like most animals, pets must drink water to survive and maintain a biorhythm. Since pets are often left alone and since communication with their owners is difficult, the demand for pet water dispensers or water supply devices has increased.
EP 3315022A1 and CN 2351955 Y disclose drinking bowls for pets. However, such drinking bowls have various disadvantages which the present disclosure solves.
The above references are incorporated by reference herein where appropriate for appropriate teachings of additional or alternative details, features and/or technical background.

DETAILED DESCRIPTION

Figure 1:
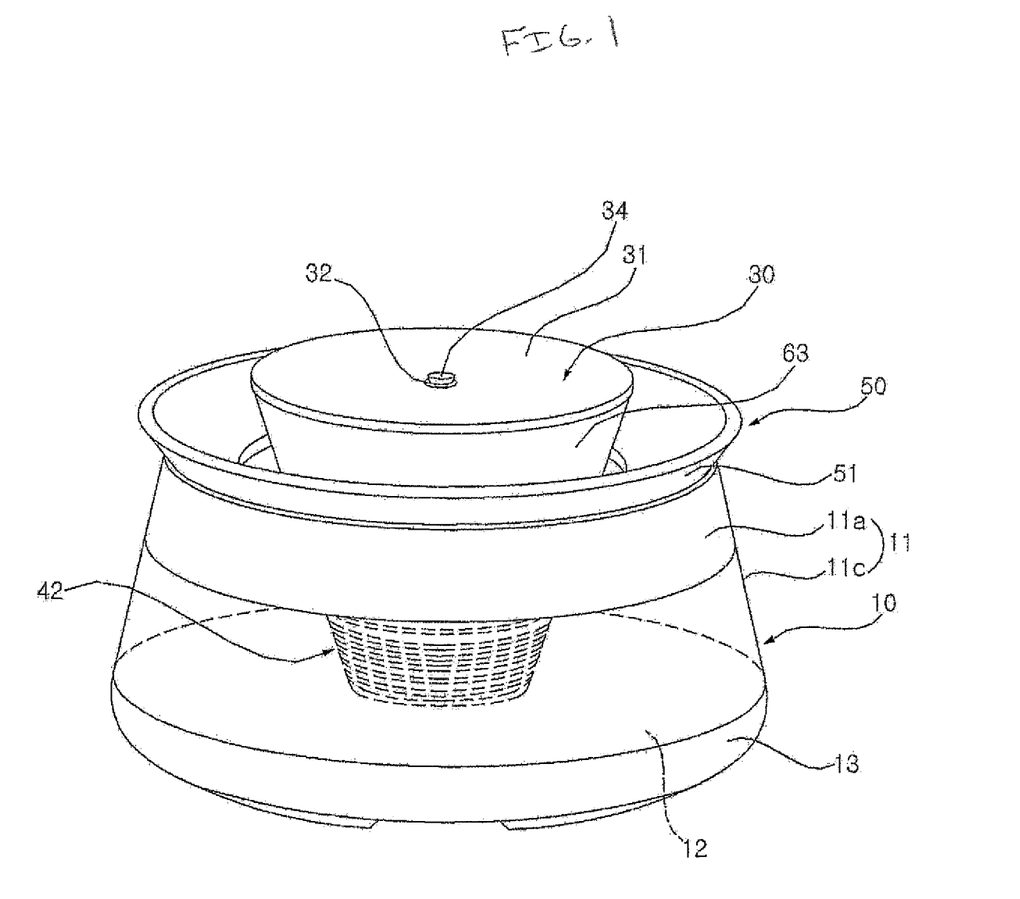
FIG. 1 is a perspective view showing an appearance of a pet water dispenser according to an embodiment.
Figure 2:
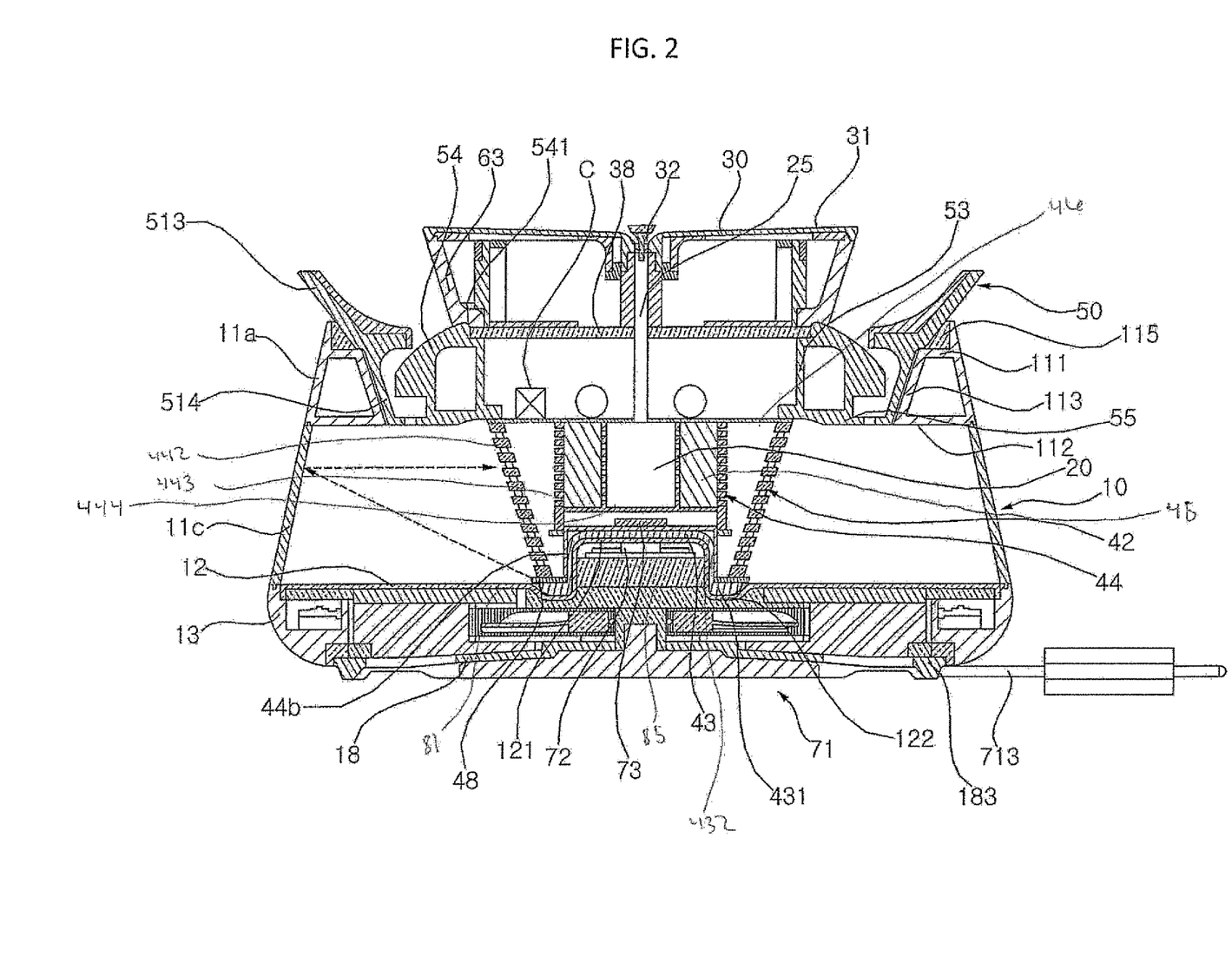
FIG. 2 is a vertical cross-sectional view of the pet water dispenser shown in FIG. 1.
Figure 3:
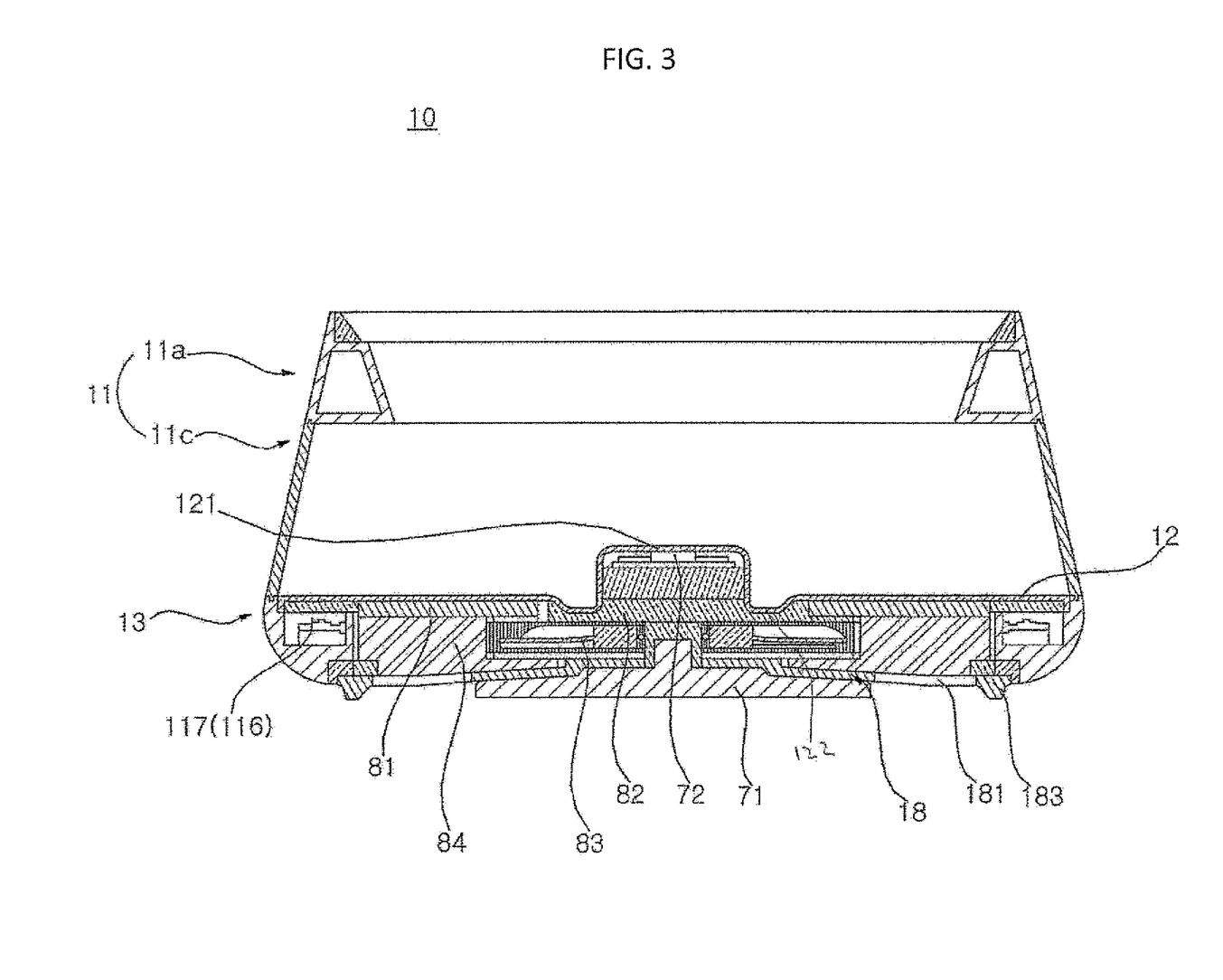
FIG. 3 is a cross-sectional view of a water tank according to an embodiment.

Referring to FIGS. 1 to 3, a liquid dispenser (e.g., a pet water dispenser) according to an may include a water tank or storage chamber 10 in which water is stored, a pump 20 installed or provided in the water tank 10 to transfer or supply water stored in the water tank 10, and a water supply plate or upper plate 30 over which water supplied from a water supply pipe 25 connected to the pump 20 flows.
A water guide or a water receiver 50 may be provided between the water tank 10 and the water supply plate 30 to receive water dropped from the water supply plate 30 and guide the dropped water back to the water tank 10. The water guide 50 may also be referred to as a splash guard or drop tray. The water guide 50 may include an outer guide wall 51, an inner guide wall 53 spaced apart from and inside of the outer guide wall 51, and a bottom wall 55 connecting lower ends of the outer and inner guide walls 51 and 53. A drain passage 52 to guide water dropped to the water guide 50 from the water supply plate 30 may be formed between the outer and inner guide walls 51 and 53. At least one discharge hole 56 may be formed in the bottom wall 55 to discharge or guide water into the water tank 10.
The outer guide wall 51 may include upper and lower inclined surfaces 513 and 514. The upper inclined surface 513 may extend from an upper end of the lower inclined surface 514, and a lower end of the lower inclined surface 514 may be coupled to the bottom wall 55. Water may be dropped onto the upper inclined surface 513 from the water supply plate 30. Inclinations of the upper and lower inclined surfaces 513 and 514 may be different. For example, the lower inclined surface 514 may have a steeper inclination than the upper inclined surface 513. Alternatively, the upper and lower inclined surfaces 513 and 514 may have equal inclinations. The upper inclined surface 513 may appear to protrude outward from the lower inclined surface 514 via a step portion provided between the upper and lower inclined surfaces 513 and 514.
The inner guide wall 53 may be provided with a guide 54 at a portion corresponding to where water may be dropped from the upper inclined surface 513. For example, the guide 54 may be an upper surface of the inner guide wall 53, and a portion of the guide 54 may be provided below the upper inclined surface 513 to catch falling water. An upper surface of the guide 54 that contacts water may be inclined or convexly curved downward. The guide 54 may be inclined outward from a top end to a bottom end, while the upper inclined surface 513 may be inclined inward from a top end to a bottom end. The guide 54 of the inner guide wall 53 may be inclined in a direction opposite to a direction in which the upper inclined surface 513 of the outer guide wall 51 is inclined so catch water from the upper inclined surface 513.
The water supply plate 30 may have a substantially smooth upper surface 31, and water supplied from the water supply pipe 25 may reach the upper surface 31 of the water supply plate 30 via a water supply hole 32, flow over the upper surface 31 of the water supply plate 30, and flow to the water guide 50. The water supply plate 30 may have a slight upward inclination (e.g., 2°) from the water supply hole 32 to an edge in order to slow a flow of water. Alternatively, the water supply plate 30 may be substantially flat. Depending on a humidity (or depending on a species of pet or a pet's preferences), the pet may drink water flowing on an upper surface 31 of the water supply plate 30 with its tongue, or may consume water falling from the water supply plate 30 to the water guide 50.
The water supply plate 30 may be formed of a plate having a smooth upper surface 31, and the water supply hole 32 may be formed at a center thereof. Although the water supply plate 30 is exemplified in the figures to have a disk or circular shape, it may be formed in various other shapes (e.g., hexagonal with six vertices). The water supply plate 30 may be made of a light guide or reflective material (e.g., stainless steel or pigmented plastic), or alternatively may be made of a transparent or translucent material (e.g., glass or plastic). The water supply plate 30 may be formed to have a thin thickness.
A plug or float 34 may be provided in the water supply hole 32 to an restrict upward movement of water discharged from the water supply hole 32. The plug or float 34 may serve as a diverter. The water discharged from the water supply hole 32 may collide with the plug 34, and may be refracted in a horizontal direction to flow along the upper surface 31 of the water supply plate 30. A lower end or stem of the plug 34 may be inserted into a trumpet-shaped portion 321 of the water supply hole 32 to form a ring-shaped gap between an inner surface of the trumpet-shaped portion 321 and an upper end or head of the plug 34. Water may be discharged through the ring-shaped gap to form a water film having a surface that is substantially parallel to the upper surface 31 of the water supply plate 30.

The plug 34 may include optional ribs to keep the plug 34 within the water supply hole 32. The plug 34 may remain fixed within the water supply hole 32, or alternatively the plug 34 may serve as a float, and the plug 34 may move up and down depending on a pumping capacity of the pump 20 as the ribs of the plug 34 move up and down within vertical grooves provided on an inner surface of the water supply hole 34.

An illumination assembly 60 may be provided below the water supply plate 30. The water supply plate 30 may be configured to be removable from the inner assembly 100. The water supply plate 30 may be lifted up and removed to be cleaned, repaired, or swapped with another water supply plate 30 having a different height, shape, angle of inclination, material, etc.

The illumination assembly 60 may include a light emitting device or a light device 61, a light support or base 62 on which the light device 61 is mounted, a support or light diffuser 63 provided to surround an outer side of the light base 62, and a partition plate 38 on which the light base 62 and the support 63 are mounted. The light base 62 may also be referred to as a light mount, and the support 63 may also be referred to as a light guide plate or light guide, to guide or diffuse light from the light device 61.

The light base 62 may be formed in a cylindrical shape, while the support 63 may be formed in a truncated cone shape to have an inclined surface. The light base 62, the support 63, and the partition plate 38 may be joined (e.g., fused, welded, or bonded) together to be integral with each other, or may be assembled to be detachable from each other via hooks, screws, etc.

The illumination assembly 60 may support the water supply plate 30 to be above the water guide 50 and an upper end of the water tank 10. The light device 61 may include at least one light emitting diode (LED) or at least one organic light emitting diode (OLED), and may be mounted in the outer side of the light base 62 to emit light to the support 63. The support 63 may be made of a transparent or translucent material, and may diffuse light from the light device 61 to an outside of the illumination assembly 60.

The water tank 10 may include a container having an upper opening through which a user may fill water or liquid. However, embodiments disclosed are not limited to a water tank 10 having an upper opening. For example, the water tank 10 may have a closed container in which water or liquid is stored, and an additional water supply pipe may supply water into the water tank 10. A water supply valve to open and close the water supply pipe may be provided to control a supply of external water (e.g., from a pipe or faucet connected to the additional water supply pipe) into the water tank 10.

The water guide 50 and the water supply plate 30 may together close the upper opening of the water tank 10. Food dropped from the mouth or snout of an animal may be prevented from entering the upper opening of the water tank 10. In addition, the bottom wall 55 and the at least one discharge hole 56 may be configured to additionally filter water entering the water tank 10.

The water tank 10 may include a wall 11 defining a storage space or chamber of the container to store water, and a water tank base or a container support 13 provided below and supporting the wall 11. An upper end of the wall 11 may define the upper opening of the water tank 10 (or an inlet of the water tank 10). The water tank 10 may further include a bottom plate 12 defining a bottom of the storage space and a top of the water tank base 13, and the wall 11 may surround the bottom plate 12.

The bottom plate 12 may be made of a material of high thermal conductivity or metal material (e.g., stainless steel) an upper surface of the bottom plate 12 reflects light. However, embodiments disclosed herein are not limited to a metal bottom plate 12. For example, the bottom plate 12 may be made of plastic and a highly reflective material or coating film may be coated onto the bottom plate 12, or a metal may be deposited or deposed onto the bottom plate 12.

A convex protruding portion or protrusion 121 may be formed in the bottom plate 12 and protrude upward at a center of the bottom plate 12. The protrusion 121 may have a hollow cylindrical shape having an inner space below the bottom plate 12, and a first wireless power transfer device 72 (e.g., a first wireless power transceiver or a transmitter) may be provided in the inner space of the protrusion 121. The bottom plate 12 may be integrally formed with the wall 11, or alternatively may be separately formed and joined (e.g., via press-fitting and/or bonding or welding). A ring-shaped groove or recess 122 may be formed in the bottom plate 12 to surround the protrusion 121 so as to be concave downward.

The water tank 10 may be formed in a truncated cone shape with a diameter that decreases from a lower end to an upper end. When the water tank 10 is formed in a truncated cone shape, the water tank 10 may not be easily overturned even when an external impact is applied to the water tank 10. However, embodiments disclosed herein are not limited to a water tank 10 having a truncated cone shape. For example, the water tank 10 may be cylindrical.

Figure 6:
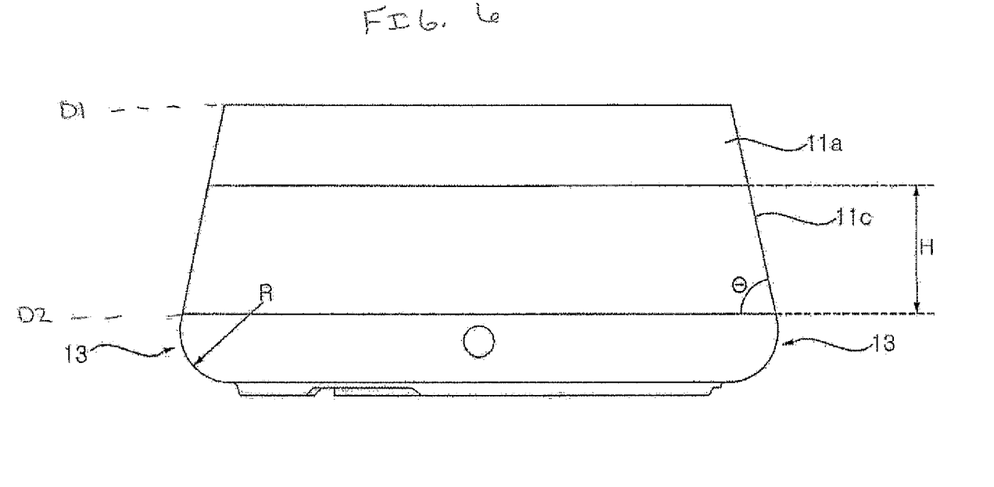
FIG. 6 is a front view of the water tank showing an inclination angle of the main wall of the water tank and the radius of curvature of a container support according to an embodiment.

When the water tank 10 has a truncated cone shape, the wall 11 may be inclined outward from the upper end of the wall 11 toward the lower end of the wall 11, which may couple to the water tank base 13. The wall 11 may generally have a symmetrical truncated cone shape in which a cross-section is circular. In FIG. 6, D1 denotes a diameter of a circle defined by the upper end of the wall 11, and D2 denotes a diameter of a circle defined by the lower end of the wall 11.

The wall 11 may include a main wall 11c having upper and lower openings and an upper wall 11a having a lower end coupled to an upper end of the main wall 11c. An upper end of the water tank base 13 may be coupled to a lower end of the main wall 11c.

Figure 4:
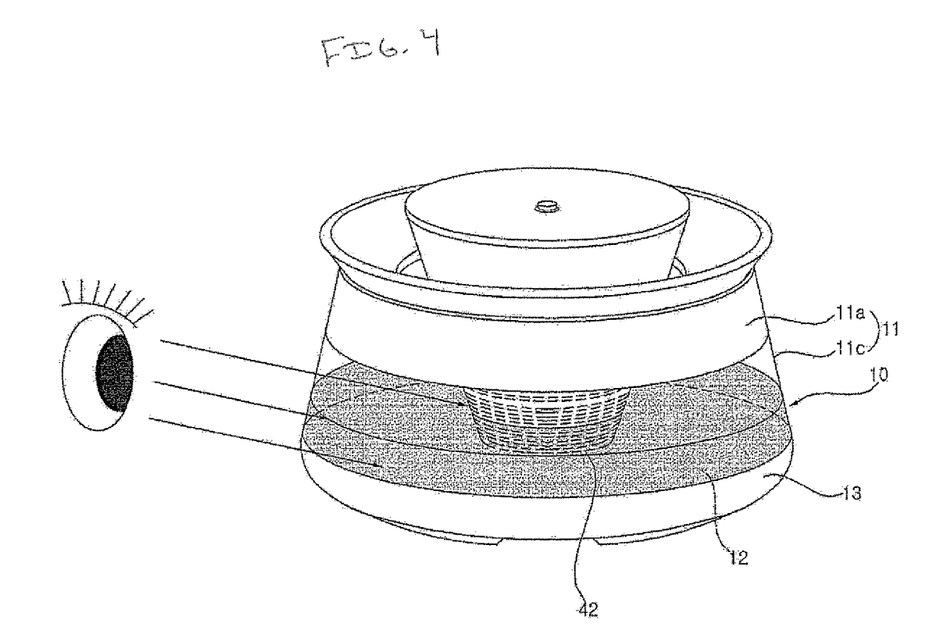
FIG. 4 illustrates a transparent main wall according to an embodiment.

Referring to FIG. 4, the main wall 11c, the upper wall 11a, and the water tank base 13 may be integrally made of the same material, or alternatively may be separately manufactured as separate materials and joined (e.g., fused, bonded, or welded) together for integration. As an example, the upper wall 11a and the water tank base 13 may be manufactured from various materials having excellent aesthetics (e.g., stainless steel or pigmented plastic), and the main wall 11c may be made of a transparent material (e.g., glass or plastic) so that an amount of water in the water tank 10 may be gauged by a user looking into the main wall 11c.

When the main wall 11c is made out of a transparent material, the water contained in the storage space of the container of the water tank 10, along with the bottom plate 12 and a first filter 42 of a filter assembly, may be visible through the main wall 11c, which may enhance aesthetics. A user may also be able to see a flow of water entering the pump 20 through the first filter 42, and water waves reflected on the bottom plate 12.

In addition, the user may determine an amount of water contained in the water tank 10 by looking at the main wall 11c. Therefore, the user can predict when to replace and/or fill water so that water may be stably supplied in the water tank 10.

Figure 5:
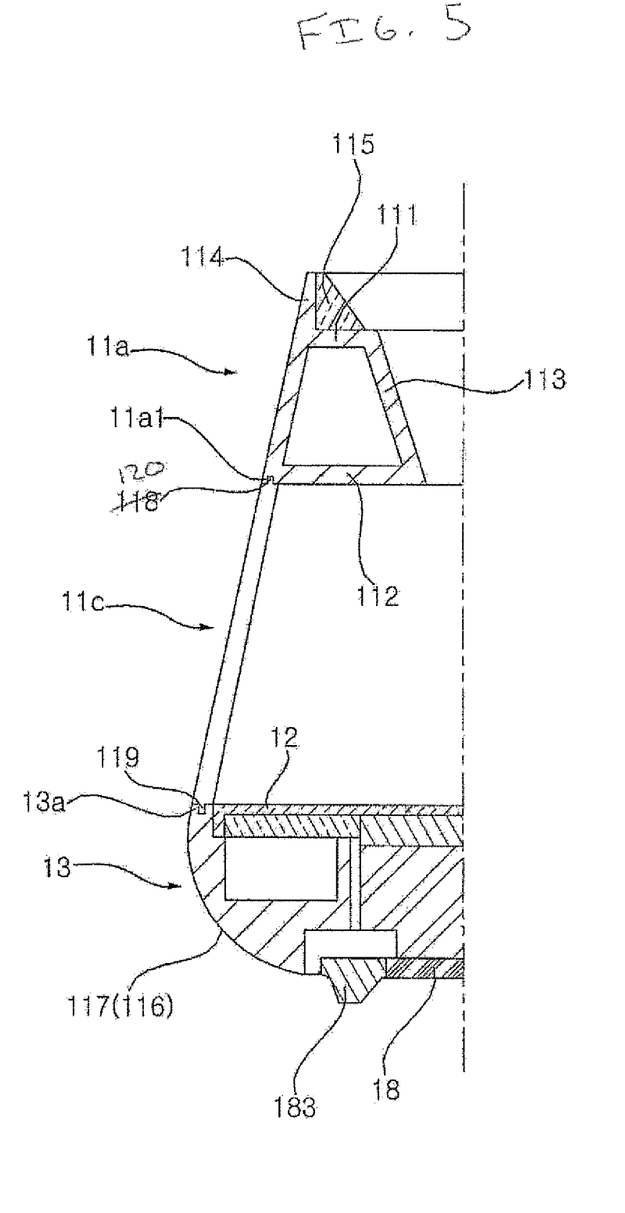
FIG. 5 is an enlarged view of a portion of FIG. 3.

Referring to FIG. 5, protrusions 120 and 119 may be formed at the upper and lower ends of the main wall 11c, and the lower end of the upper wall 11a and the upper end of the water tank base 13 may include grooves 11a1 and 13a, respectively, to correspond to the protrusions 120 and 119 of the main wall 11c. The protrusions 120 and 119 may be inserted, into the grooves 11a1 and 13a, respectively, so that the main wall 11c may be pressed-fit or snapped-fit to the upper wall 11a and the water tank base 13. The protrusions 120 and 119 may further be welded or fused into the grooves 11a1 and 13a.

The main wall 11c may have a truncated cone shape in which an outer diameter (and/or an inner diameter) gradually decreases from the lower end to the upper end. The upper wall 11a may extend upward from the upper end of the main wall 11c and have an outer diameter gradually decreasing toward an upper end.

The upper wall 11a may include an outer wall or outer surface aligning with the main wall 11c and including the groove 11a1, and may further include an inner tank wall 113 that is coupled to the outer wall via first and second protruding plates 111 and 112. The first and second protruding plates 111 and 112 may extend laterally from the outer wall toward a center of the water tank 10, and may be spaced apart in a vertical direction. The inner tank wall 113 may extend between the first and second protruding plates 111 and 121.

The inner tank wall 113 may be inclined, and positions of the first and second protruding plates 111 and 112 may be configured to set an inclination of the inner tank wall 113. The first protruding plate 111 may be provided above the second protruding plate 112. In addition, lengths of the first and second protruding plates 111 and 112 may be configured to set an inclination of the inner tank wall 113. A length of the first protruding plate 111 may be shorter than a length of the second protruding plate 112, and the inner tank wall 113 may be inclined outward from a lower end coupled to an inner end of the second protruding plate 112 to an upper end coupled to an inner end of the first protruding plate 111. Outer ends of the first and second protruding plates 111 and 112 may be coupled to the outer wall of the upper wall 11a.

An inner diameter of the storage space of the water tank 10 at the first protruding plate 111 may be larger than an inner diameter of the storage space of the water tank 10 at the second protruding plate 112. An inner surface of the upper wall 11a, which may be defined by the inner tank wall 113, may appear to have a truncated cone shape that is inclined in a direction opposite to an inclination of the outer surface of the water tank 10 defined by the wall 11. A space between the outer wall of the upper wall 11a and the inner tank wall 113 may be hollow so as to use less material, save manufacturing costs, and reduce a weight of the water tank 10.

The upper wall 11a and the inner tank wall 113 may serve to support the water guide 50. The lower inclined surface 514 of the water guide 50 may be placed on and supported by the inner tank wall 113.

The outer wall of the upper wall 11a may include an upwardly projecting wall or extension 114 projecting upward from the outer end of the first protruding plate 111. A bumper 115 may be provided on the first protruding plate 111 and the extension 113. The bumper 115 may be made of an elastic material (e.g., rubber, silicone, or fiber) and may be referred to as packing or cushioning. The bumper 115 may be fixed (e.g., adhered) to the upper wall 11a by a ring-shaped member made of a soft or elastic material (e.g., rubber, silicone, etc.). The bumper 115 may be fixed using an adhesive such as a pressure-sensitive adhesive (e.g., double-sided tape or a bond). In this case, a bottom surface of the bumper 115 may be attached to an upper surface of the first protruding plate 111, and an outer surface of the bumper 115 may be attached to an inner surface of the extension 114 of the upper wall 11a.

An inner circumferential surface of the bumper 115 may form an inclined surface inclined outward from a lower end to an upper end. The inclined surface of the bumper 115 may be in close contact with an outer surface of the outer wall 51 of the water guide 50 when the water guide 50 is inserted into the water tank 10.

An outer circumferential surface 116 of the water tank base 13 may include a curved edge or corner 117 having a downward, convex curvature. The outer circumferential surface 116 may be curved from a lower end of the main wall 11c toward a lower end or bottom of the water tank base 13. The edge 117 may extend from a lower side of the bottom plate 12 to a bottom side of the water tank base 13 by extending inward along the radial direction.

Although a curved edge 117 is exemplified in the figures, embodiments disclosed are not limited hereto. For example, the edge 117 may have a sharp corner. However, when the edge 117 is formed with angled corners, it may be inconvenient for a user to lift and pick up the water tank 10 as a space in which a user may wedge a finger is narrow. In addition, angled corners may be easier to strike and may cause an injury to animals.

A curved edge 117 may be easier for a user to lift, as a user may wedge a finger between the edge 117 and the floor or easily grip a bottom of the water tank base 13. Further, a curved edge 117 may be more stable, as any unintended force by accidental strikes by a pet or the owner may be dispersed throughout the curved edge 117. When a pet strikes the water tank 10 and the water tank 10 is moved or overturns, the curved edge 117 may roll back to an initial position to stabilize the water tank 10.

Referring to FIG. 6, a radius of curvature R of the edge 117 of the water tank base 13 may be approximately 20 to 30 mm (e.g., 23 mm), but embodiments disclosed are not necessarily limited to this radius of curvature R. The radius of curvature R may be configured so that the edge 117 may be easily gripped and may reduce a possibility of the pet water dispenser from tipping over and spilling.

Referring to FIGS. 1-2 and 4, at least one filter 42 and/or 44 to filter foreign substances contained in the water may be installed or provided in the water tank 10. The at least one filter 42 and/or 44 may filter water in the water tank 10 before the water flows into the pump 20. There may be a plurality of filters 42 and 44. A first filter 42 may be a strainer having a trumpet or truncated cone shape. Alternatively, the first filter 42 may have a cylindrical shape. The first filter 42 may be made out of a material having a considerable rigidity (e.g., metal or plastic). The first filter 42 may have a plurality of water inflow ports or through-holes formed on a wall to filter substances having a particle size larger than a size of the through-holes.

A lower end of the first filter 42 may be coupled to a lower filter cover or cap 43. The lower filter cover or cap 43 may be inserted onto the protrusion 121 formed in the bottom plate 12. The lower filter cover 43 may include a cap or cylindrical shell 432 formed with a concave space into which the protrusion 121 may be inserted at the bottom, and a flange 431 extending radially outward from a lower end of the cap 432 to be inserted into the groove 122 surrounding the protrusion 121. The lower end of the first filter 42 may be coupled to an upper surface of the flange 431, and the cap 431 may be provided within the first filter 42.

The flange 431 may be configured to have a shape corresponding to a shape of the groove 122 so that the flange 431 may be seated in the groove 122 with the cap 432 overlaid on the projection 121. The protrusion 121 may prevent a lateral or horizontal displacement of the first filter 42.

A second filter 44 may be provided inside a hollow space of the first filter 42. A predetermined space may be formed inside the second filter 44 in which the pump 20 may be provided. The second filter 44 may have a plurality of through holes formed in a wall through which substances in the water may be filtered. The through holes of the second filter 44 may be formed to be smaller than the through holes of the first filter 42 so that the second filter 44 may filter finer substances than the first filter 42. Since the second filter 44 may surround the pump 20, filtration may be performed regardless of a direction in which the water flows, and may be enhanced as compared to a case where a pump is provided on one side of a filter.

The second filter 44 may include a cylindrical outer wall or a first wall 442 formed with a plurality of through holes and a cylindrical inner wall 443 or a second wall provided inside the outer wall 442 and also having a plurality of through holes. The pump 20 may be provided inside of the inner wall 443.

The inner wall 443 may be spaced apart from the outer wall 442 so that a space is formed between the outer wall 442 and the inner wall 443. The space between the inner and outer walls 443 and 442 may be filled with a filter medium 45 (e.g., a carbon filter material). The filter medium 45 may include carbon particles, but is not necessarily limited thereto. For example, the filter medium 45 may be a member made of a fiber or a network structure. Since the pump 20 may be provided inside of the inner wall 443 of the second filter 44, filtered water may pass through the first filter 42, the second filter 44, and the filter medium 45 in that order to prevent or reduce an inflow of foreign matter into the pump 20.

A support plate 444 may be further provided to close a lower side of the space filled with the filter medium 45 to support the filter medium 45. The support plate 444 may also support the pump 20 provided inside of the inner wall 443. An outer diameter of the support plate 444 may be substantially the same as an inner diameter of the outer wall 442. The support plate 444 may divide the outer wall 442 into an upper and lower section. The upper section of the outer wall 442 may include through holes, while the lower section of the outer wall 442 may not include through holes.

The support plate 444 may be integrally formed with the inner wall 443 to close a lower opening of the inner wall 443, but is not necessarily limited thereto. Alternatively, the support plate 444 may be formed separately from the inner wall 443 and later coupled to the lower end of the inner wall 443. In such an alternative embodiment, the support plate 444 may be welded to be permanently fixed to the inner wall 443, or may be configured to be detachable so that the filter medium 45 may be replaced. Otherwise, the filter medium 45 may be replaced by removing an upper filter cover 46 provided at upper ends of the first and second filter 42 and 44. The upper filter cover 46 may be provided on upper ends of the inner and outer walls 443 and 442 of the second filter 44, and on an upper end of the wall of the first filter 42.

A support cylinder 44b may be provided between the second filter 44 and the lower filter cover 43. The support cylinder 44b may be a cylindrical shell having a concave receiving space or cavity into which the lower filter cover 43 is inserted. At least a portion of the support cylinder 44b may be inserted into a lower opening defined by the lower section of the outer wall 442 of the second filter 444. The lower opening of the outer wall 442 may be press-fitted into the support cylinder 44b. However, the present disclosure is not limited to a pressed-fitted coupling of the outer wall 442 and the support cylinder 44b, and the outer wall 442 of the second filter 44 may be coupled to the support cylinder 44b by fastening members such as screws or bolts.

A sealed space to receive a second wireless power transfer device 73 (e.g., a second wireless power transceiver or a receiver) that interacts with the first wireless power transfer device 72 may be formed within the second filter 44 between the support plate 444 and the support cylinder 44b. An upper portion of the support cylinder 44b may be coupled to a lower end of the outer wall 442, and the sealed space may be defined by the support cylinder 44b on bottom, the support plate 444 on top, and the lower section of the outer wall 442 at sides. The lower section of the outer wall 442 may not have through holes so as to prevent water from leaking into the sealed space and damaging the second wireless power transfer device 73. The second wireless power transfer device 73 may receive and/or transmit wireless power to or from the first wireless power transfer device 72, and may generate inductive power to drive the electronic devices such as the pump 20.

At least one sterilizing filter or sterilizing light 48 to sterilize water contained in the water tank 10 may be provided. The sterilizing filter 48 may include an ultraviolet (UV) light source. For convenience of description, the sterilizing filter 48 will be referred to as a UV light 48. The UV light 48 may be provided on the lower end of the first filter 42 and on an upper surface of the flange 431 of the lower filter cover 43. Light emitted by the UV light 48 may be irradiated to both inside and outside the first filter 42.

Light emitted from the UV light 48 may be incident on the wall 11 and the bottom plate 12 of the water tank 10. Some of the incident light may be reflected by an upper surface of the bottom plate 12 to reach all corners or areas of the container and/or storage space of the water tank 10. Some of the light incident on the main wall 11c may pass through the main wall 11c because the main wall 11c of the water tank 11 is made of a transparent material, while some of the light may be reflected or refracted back into the water tank 10 toward the first filter 42, as shown by the dotted line arrow in FIG. 2. The UV light 48 may emit light in a visible wavelength (e.g., blue) In addition to UV light.

When an inner surface of the main wall 11c is vertical or inclined outward from the bottom end to the top end (as opposed to the truncated cone shape as exemplified in the figures), the UV light 48 may be less effective, as light incident on the inner surface of the main wall 11c may be reflected toward an upper side of the water tank 10 above a water surface. However, in the exemplified water tank 10 having a truncated cone shape inclined inward from the bottom end to the top end, light incident on the inner surface of the main wall 11c may be reflected back into a water-filled space of the water tank 10 and reach the first filter 42.

There may be an optional second UV light provided on the lower end of the outer wall 442 of the second filter 44, and a third UV light provided to surround an upper portion of the water supply pipe 25. The second UV light may help sterilize water stored in the water tank 10, while the third UV light may sterilize water flowing through the water supply pipe 25. The third UV light may extend higher than an outlet end of the water supply pipe 25 to directly sterilize water before water is discharged through the water supply hole 32. Details of the second and third UV lights are found in U.S. application Ser. No. 16/570,279 filed on Sep. 13, 2019, the entire contents of which is incorporated by reference herein.

As shown in FIG. 6, an angle Θ between the main wall 11c and a horizontal axis may be an acute angle between 70° and 80° (e.g., 78°). A position of the UV light 48 may be configured so that at least some of the light incident on the main wall 11c is reflected toward a center of the water tank 10. As an example, the UV light 48 may be provided at a position at or lower than a midpoint height (i.e., ½ of a height H) of the main wall 11c. When the first filter 42 is made of metal, the first filter 42 may also serve to reflect the UV light in the water tank 10.

Embodiments disclosed herein are not limited to a main wall 11c inclined by a predetermined angle Θ. As an example, the main wall 11c may be formed of a curved or wavy surface having a curvature in which a gradient changes within the above-mentioned angular range. The main wall 11c may have a predetermined thickness, and the inner surface and an outer surface of the main wall 11c may have equal same inclinations to form the predetermined angle Θ with the horizontal axis.

Referring back to FIGS. 2 and 4, the upper filter cover 46 may cover upper ends of the first and second filters 42 and 44 to close upper openings of the first and second filters 42 and 44. The upper filter cover 46 may include a through hole formed at a center through which the water supply pipe 25 may pass.

The upper filter cover 46 may be fused or adhered to the first and second filters 42 and 44 so as to be integral, or alternatively may be detachably coupled to the first and second filters 42 and 44 (e.g., via a hook or screw) to facilitate easy replacement or reparation of the first and second filters 42 and 44 and/or the filter medium 45.

The base plate 18 may be spaced downward from the bottom to cover a lower opening of the water tank base 13 defined by a lower end of the outer peripheral surface 116. A sealed space may be formed between the base plate 18 on bottom, the bottom plate 12 on top, and the water tank base 13 at a side. Various electronic devices (e.g., a thermoelectric element 81) to be described later with reference to FIG. 7 may be installed in the space of the water tank base 13.

Referring to FIGS. 2, 3, and 5, the base plate 18 may be placed on a docking station 71. The docking station 71 may include a first connection terminal connected to an external power source through a wire 713, and the base plate 18 may include a second connection terminal that electrically connects to the first connection terminal when the base plate 18 is seated on the docking station 71. Power may be supplied from the second connection terminal to the first wireless power transfer device 72, which may wireless transmit power via a wireless power transfer (WPI) method to the second wireless power transfer device 73. Details of the first and second wireless power transfer devices 72 and 73, along with the first and second connection terminals, may be found in U.S. application Ser. No. 16/571,089 filed on Sep. 14, 2019 and U.S. application Ser. No. 16/571,075 filed on Sep. 14, 2019, the entire contents of which is incorporated by reference herein.

At least one leg or support base 183 may be provided on a bottom of the base plate 18 to support the base plate 18. The support base 183 may contact a floor or ground surface when the pet water dispenser is placed on the floor, and can support the pet water dispenser. The support base 183 may be formed as an annular rib or flange extending around the bottom of the base plate 18, or alternatively there may be a plurality of legs 183 that protrude from a bottom of the base plate 18 at a plurality of positions along the edge of the bottom of the base plate 18. A bumper or gripping surface or material made of a material having a strong grip or friction with the floor (e.g., rubber) may be provided on a bottom surface of the support base 183 to prevent the pet water dispenser from slipping or sliding.

The edge 117 of the water tank base 13 be formed on an outer side of the support base 183. A bottom of the edge 117 may be provided higher than a lower end of the support base 183 such that the edge 117 may not contact the floor. The support base 183 may facilitate an easy lifting of the edge 117 by a user, as there may be more space between the edge 117 and the floor in which a user may wedge a finger for lifting.

Figure 7:
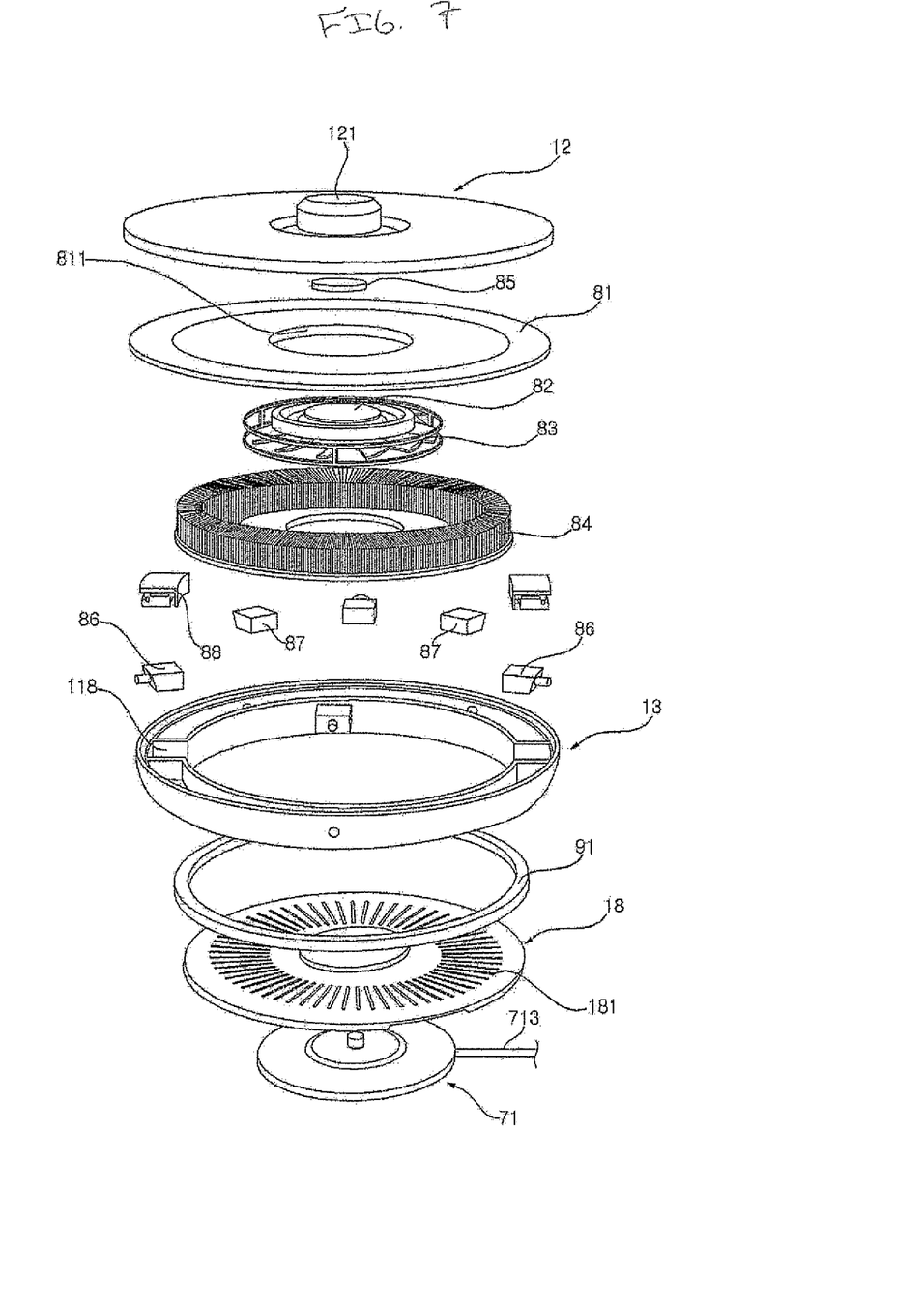
FIG. 7 is an exploded perspective view illustrating electronic devices provided below a bottom plate of the water tank according to an embodiment.

Referring to FIGS. 2 and 7, a thermoelectric element 81 to maintain a temperature of water in the water tank 10 at a predetermined temperature or within a predetermined temperature range may be provided under the bottom plate 12. The thermoelectric element 81 may be a thermoelectric cooler (TEC) or a Peltier device. A motor 82 may be installed in a hollow portion or hole 811 provided in a center of the thermoelectric element 81, and a fan 83 operated by the motor 82 may be provided below the motor 82. A heat sink 84 may be provided to surround the fan 83. The heat sink 84 may include a heat dissipation plate and a plurality of heat radiating fins provided on an upper, outer edge of the heat dissipation plate, and the plurality of heat radiating fins may surround the fan 83. As an alternative, the heat radiating fins may be provided a lower, outer edge of the heat dissipation plate to extend downward.

A water temperature sensor 85 may be provided in the inner space inside the protrusion 121 and under the bottom plate 12. Alternatively or in addition thereto, the water temperature sensor 85 may include a probe that is inserted through the bottom plate 12 to directly contact water in the water tank 10. When a probe is omitted, the water temperature sensor 85 may be positioned right blow an upper end of the protrusion 121, which may be made of metal or another heat transferring material, and the water temperature sensor 85 may have a large surface area to accurately measure a temperature of water flowing over the protrusion 121 and entering the pump 20.

When a temperature of the water in the water tank 10 sensed by the water temperature sensor 85 is not within the predetermined temperature range, the thermoelectric element 81 may be operated to cool the water or heat the water accordingly, and excess heat (or cool air) may be transmitted to and dissipated through the heat sink 84 and vented to an outside via vents 181. Alternatively or in addition thereto, there may be exhaust vents formed on a side or on the edge 117 of the water tank container 13.

When a temperature of the thermoelectric element 81 is higher than a first thermoelectric predetermined temperature or when a temperature of the heat sink 84 is higher than a first heat sink predetermined temperature, the motor 82 may be operated to rotate the fan 83. When the fan 83 is rotated, external air flows into the heat sink 84 and then is discharged to an outside through the vent 181 formed in the base 18. The heat sink 84 and the thermoelectric element 81 may be cooled by the fan 83.

A mounting portion 118 may be formed on an inner circumferential surface of the water tank base 13, and may include a recession or cavity in which a water level sensor 86 may be provided. The water level sensor 86 may be a strain gauge or load sensor to sense a weight of water applied to the bottom plate 12 of the water tank 10, and a water level or an amount of water in the water tank 10 may be determined by the weight of the water detected by the water level sensor 86.

Various kinds of sensors such as a proximity sensor 87, a gyro sensor 88, and a contamination level sensor (not shown) may be provided in the mounting portion 118 of the water tank base 13. The proximity sensor 87 may sense when a pet is within (or approaching within) a predetermined distance range of the pet water dispenser, and the gyro sensor 88 may sense an inclination or tilt of the water tank base 13 and/or the water supply plate 30. The pump 20 may be controlled based on a pet position detected by the proximity sensor 87. In addition, a plurality of legs 183 may have adjustable heights, and heights of the plurality of legs 183 may be adjusted based on an inclination sensed by the gyro sensor 88.

A warning light 91 may be provided on a lower portion of the water tank base 13. When a water level in the water tank 10 detected by the water level sensor 86 is lower than a predetermined water level value, the warning light 91 may be turned on to alert a user to replace or refill water in the tank 10. The warning light 91 may be a ring-shaped light emitting diode (LED) or organic light emitting diode (OLED), and may emit visible light of various wavelengths. For example, when the water level in the water tank 10 sensed by the water level sensor 86 is lower than a predetermined water level value, the warning light 91 may blink red light.

Referring to FIG. 2, there may be a controller C and an auxiliary battery B provided in a sealed space defined by the upper filter cover 46, the partition plate 38, and the inner guide wall 53 of the water guide 50. The auxiliary battery B may be charged by induced power provided by the second wireless power transfer device 73, and the controller C may control an operation of the pump 20. The controller C may have a communication module to communicate with a communication module of a second controller provided in the water tank base 13 that controls an operation of the thermoelectric element 81, the water level sensor 86, the water temperature sensor 85, the motor 82, the proximity sensor 87, and the gyro sensor 88. The second controller may control an operation of the warning light 91, the thermoelectric element 81, the motor 82, and the optional adjustable legs 183, and may communicate with the controller C based on sensed measurements from the water level sensor 86, the water temperature sensor 85, the proximity sensor 87, and the gyro sensor 88.

A center of gravity of the water tank 10 may be entirely located at a lower side, as the thermoelectric element 81, the motor 82, the fan 83, the heat sink 84, etc. provided in the water tank base 13 may provide substantial weight. Even when a substantial external force is applied, the water tank 10 may remain in a stable position without being tilted or overturned due to a low center of gravity, and water may be continuously supplied to the pet.

This application is related to U.S. Application Ser. No. 16/571,245 filed on Sep. 16, 2019, U.S. application Ser. No. 16/571,093 filed on Sep. 14, 2019, U.S. application Ser. No. 16/571,090 filed on Sep. 14, 2019, U.S. application Ser. No. 16/571,089 filed on Sep. 14, 2019, U.S. application Ser. No. 16/571,074 filed on Sep. 14, 2019, U.S. application Ser. No. 16/571,075 filed on Sep. 14, 2019, U.S. application Ser. No. 16/571,073 filed on Sep. 14, 2019, U.S. application Ser. No. 16/570,310 filed on Sep. 13, 2019, U.S. application Ser. No. 16/570,279 filed on Sep. 13, 2019, U.S. application Ser. No. 16/569,827 filed on Sep. 13, 2019, U.S. application Ser. No. 16/659,841, filed on Sep. 13, 2019, and U.S. application Ser. No. 16/569,908 filed on Sep. 13, 2019, the entire contents of which are incorporated by reference herein.

Further, the following Korean Applications are also incorporated herein by reference: 10-2018-0122992 filed on Oct. 16, 2018; 10-2018-0123552 and 10-2018-0123553 filed on Oct. 17, 2018; 10-2018-0131037 filed on Oct. 30, 2018; 10-2018-0131405 filed on Oct. 31, 2018; 10-2019-0059513 and 10-2019-0059514 filed on May 21, 2019; 10-2018-0133062 filed on Nov. 1, 2018; 10-2019-0059787 filed on May 22, 2019; 10-2019-0060918, 10-2019-0060919, and 10-2019-0060920, filed on May 24, 2019; and 10-2019-0080603 and 10-2019-0080604 filed on Jul. 4, 2019.

Embodiments disclosed herein may provide a pet water dispenser capable of preventing a water tank from overturning even when a pet pushes the water tank. The pet water dispenser may be equipped with a sterilizing filter using a UV light source, wherein ultraviolet rays emitted from the sterilizing filter may evenly reach and be dispersed throughout the water tank. A pet may drink water in a wide area even if an upper opening of the water tank is small. A cross section of the water tank may become smaller in an upward direction of the water tank. Scattering of water to an outside of the water tank may be prevented or reduced, while a drinking area above the opening of the water tank may be wider than the opening of the water tank. Light emitted by the sterilizing filter and incident on an inner surface of the water tank may effectively reach a filter provided in a center of the water tank.

The problems solved by embodiments disclosed herein are not limited to the above-mentioned problems, and other problems not mentioned may be clearly understood to be solved by those skilled in the art from the following description.

Water of a pet water dispenser may be provided in a water tank and pumped by a pump to reach a water supply plate via a water supply pipe. Depending on its preference or taste, a pet or an animal may drink water on the water supply plate, or may drink water falling from the water supply plate.

The water tank may include a wall defining a space or storage space to store water and a water tank base to support the wall from below. The wall may have a cylindrical shape or a truncated cone shape and may define a circumference of the space in a state of being provided on and supported by the water tank base.

When viewed from above, a top of the wall defining an upper opening may be entirely within a region defined by a bottom of the wall, and the wall may have an outer shape that gradually increases from a top to a bottom. The wall may be in the form of a truncated cone having a circular cross-sectional shape.

The wall may include a main wall extending upward from the water tank base and an upper wall extending upward from an upper end of the main wall and defining an upper end thereof. The main wall may be inclined so that an inner surface progresses radially inward toward an upper side. The main wall may be made of a transparent material. A light source to introduce or emit UV light into the main wall may be provided in the water tank. An angle of the main wall with respect to a horizontal axis or direction may be 70 to 80 degrees. The main wall may be inclined with respect to the horizontal direction so that light reflected from the light source may concentrate on the water contained inside the water tank and/or the filter, and reflected light (UV light) may effectively reach the filter. The first filter may surround the pump in the water tank to filter the water entering the pump. The light source may be provided below the first filter.

According to another aspect of the present disclosure, an inner side surface or inner surface of the wall of the water tank may be tilted radially outward from an upper end or side defining the opening toward the lower side. Since the inner side surface of the wall may be inclined toward a central portion (or inward along the radial direction) toward the upper side of the water tank, the light from the light source (sterilizing filter) may be reflected and the reflected light may be increased in the downward direction with respect to the horizontal direction, and the reflected light may be concentrated on the water contained in the water tank.

The wall may include a main wall extending upward from the water tank base and an upper wall extending upward from an upper end of the main wall and defining an upper end thereof. An inclination may be formed on an inner surface of the main wall. The main wall may be made of a transparent material. The light source may be provided at a position not exceeding a middle height of the main wall, or at or below half a length of the main wall. An angle of the inner side surface of the main wall with respect to the horizontal direction may be 70 to 80 degrees.

The first filter may surround the pump in the water tank, and may further surround a second filter that filters water flowing into the pump. The light source may be provided below the first filter. A bottom plate, which may be made of a metal material, may be provided on an inner side of the water tank to define a lower end of the space where water may be stored.

According to another aspect of the present disclosure, a pet water dispenser may include a water tank base having a wall defining a space inside of the water tank base, a wall supporting the wall from below and an opening formed in the bottom, and a docking base or base plate having a support base or a support on a bottom.

An outer surface of the water tank base may include a convex curved surface portion or a curved corner or edge extending upward from an outer side of the supporter in a radially outward direction. The curved surface portion may function to reduce a horizontal component of any force applied to the pet water dispenser by dispersing the force downward along the curved surface portion even if the animal applies force horizontally with a foot or with claws to push the water tank. The curved surface portion may extend along a circumference of the water tank base to form an annular shape.

A radius of curvature of the curved surface portion may be 20 to 30 mm. The support base may separate a bottom surface of the water tank base from a floor or ground surface where the water tank is mounted. A friction member or gripping surface may be provided on a bottom surface of the support.

According to another aspect of the present disclosure, a pet water dispenser may include a water tank or a chamber having a space or storage space to store water having an opened upper surface or an upper opening, a pump installed or provided in the water tank, a water supply pipe to transfer water discharged from the pump, and a water supply plate or an upper plate provided above the water supply pipe and supplied with water from the water supply pipe. The water tank may include a wall defining the space, a water tank base or container support supporting the wall from a lower side, and a sterilizing filter or light source provided below a first filtering filter or filter in the water tank to emit ultraviolet rays. An inner side surface of the wall may be located below an upper end defining the opening. A slope or inclination of the wall may be made to advance radially outward. A metal bottom plate may be provided on an inner side of the water tank below the light source.

Embodiments disclosed herein may include a pet water dispenser having a water tank or water storage chamber. An outer wall of the tank may increases gradual toward a lower side to have a truncated cone or trapezoidal shape, and may not be easily upset even if an external force acts on the tank.

The shape of the tank may resemble collimated light, and, regardless of how much water is stored in the tank, a center of gravity may remain stable when compared to a cylindrical tank of a vertically constant cross-section, and thus may not be easily upset even if a pet attempts to overturn the tank. A center of gravity of the tank may remain on a lower side of the tank.

An inclination of an inner surface of walls of the tank may be configured to be inward from a bottom side to a top side. The inclination may be configured such that light incident on the inner surface and emitted from a UV light source provided in the water tank may be reflected by the walls of the tank, and the reflected light may be concentrated in or toward water contained in the water tank, and sterilization of the water may be improved.

When a filter to filter the water flowing into the pump is provided in the water tank, the light reflected on the inner side surface of the wall of the tank may be concentrated on or toward the filter, improving a sterilizing effect of the filter.

The pet water dispenser may include a convex curved surface portion or a curved corner or edge provided to be curved upwardly radially outwardly around a water tank base constituting a lower portion of the water tank. Even if an animal tries to push the water tank with a foot or a claw, an applied force may be dispersed downward along the curved surface portion, preventing the water tank from being rolled over. When the docking base or base plate is provided in a lower opening formed in a bottom surface or end of the water tank base, and the docking base is supported by a lower supporting member or leg, the docking base and the water tank base may be prevented from rocking.

The effects of the present disclosure are not limited to the effects mentioned above, and other effects not mentioned can be clearly understood by those skilled in the art from the description of the claims.

Embodiments disclosed herein may be implemented as a liquid dispenser comprising a tank having an upper opening and a chamber defined by a wall, a pump provided in the chamber, a pipe to transfer liquid discharged from the pump, a plate provided above the tank and supplied with liquid from the pipe, and a base provided below the wall of the tank to support the wall. The wall may define a cross-sectional area, the cross-section area may increase from a lower end of the tank to an upper end of the tank, and the lower end may be provided on the base.

The wall of the tank may include a main wall extending upward from the base and having an inward inclination from a lower end provided on the base to an upper end, and an upper wall extending upward from the upper end of the main wall. An upper end of the upper wall may constitute the upper end of the wall of the tank defining the upper opening. The main wall may be made of transparent material.

A sterilizing light may emit UV light toward the main wall. The main wall may be inclined such that an angle between the main wall and a horizontal axis may be between 70° and 80°. A first filter may surround the pump to filter liquid entering the pump, and a second filter may be provided within the first filter to surround the pump. The sterilizing light may be provided on a lower end of the first filter.

Embodiments disclosed herein may be implemented as a liquid dispenser including a tank having a wall defining a chamber in which liquid may be stored, a pump provided in the tank to pump liquid in the chamber, a plate provided above the tank, a pipe connecting the pump to the plate to transfer liquid discharged from the pump to an upper surface of the plate, a UV light to emit UV light toward the wall, and a base provided below the wall to support the tank, wherein the wall may be inclined inward from a bottom end to a top end.

The wall may include a main wall having a bottom end provided on the base and an upper end from which an upper wall extends. An upper end of the upper wall may include an upper opening that may be exposed when the plate may be lifted away from the upper wall. The main wall may be transparent.

The UV light may be provided at a position that may have a height at or below a midpoint height of the main wall. An angle between an inner surface of the main wall and a horizontal axis may be between 70° and 80°. A filter may be provided to have a plurality of through-holes and surround the pump in the tank. The UV light may be provided on a lower end of the filter. A bottom plate may define a lower end of the chamber. The bottom plate may be made of metal, and the bottom plate may be provided below the UV light.

Embodiments disclosed herein may be implemented as a liquid dispenser comprising a tank, a pump to pump liquid stored in the tank, a pipe through which liquid discharged from the pump flows, a plate provided above the tank and supplied with liquid from the pipe, a base provided below the tank to support the tank, the base having an edge that may be convexly curved, a base plate provided below the base to close a lower opening of the base, and a support formed on a bottom surface of the base plate to space the base plate apart from a surface on which the liquid dispenser may be placed.

The edge of the base may form a curved corner surrounding the base and may be curved inward from a top end of the base toward the base plate. A radius of curvature of the edge of the base may be 20 to 30 mm. At least one electronic device may be provided in the base above the base plate and below the tank. A bottom surface of the support may be made of a material configured to grip the surface on which the liquid dispenser may be placed.

Embodiments disclosed herein may be implemented as a liquid dispenser comprising a tank, a pump, a pipe coupled to the pump to transfer liquid discharged from the pump, a plate provided above the tank and having a hole communicating with the pipe such that an upper surface of the plate may be supplied with liquid from the pipe via the hole, a base provided below the tank to support the tank, a first filter to filter the water introduced into the pump, and a UV light provided below the first filter to emit ultraviolet rays toward a side of the tank. The side of the tank may be inclined inward from a bottom end to a top end. A bottom plate made of metal may be provided under the UV light.

A liquid guide may be provided below the plate to catch liquid falling off the plate and an illumination assembly provided between the liquid guide and the plate to support the plate above the liquid guide. The plate and the liquid guide may together close an upper opening of the tank when the liquid guide is inserted into the tank.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, comprising:
   a tank having an upper opening and a chamber defined by a wall;
   a pump provided in the chamber;
   a pipe to transfer liquid discharged from the pump;
   a plate provided above the tank and supplied with liquid from the pipe; and
   a base provided below the wall of the tank to support the wall,
   wherein a lower end of the tank is provided on the base, wherein the wall of the tank includes:
      a main wall extending upward from the base and having an inward inclination from a lower end provided on the base to an upper end; and
      an upper wall extending upward from the upper end of the main wall, wherein an upper end of the upper wall constitutes the upper end of the wall of the tank defining the upper opening, and
   wherein the liquid dispenser further comprises:
      a sterilizing light that emits ultraviolet (UV) light toward the main wall;
      a first filter surrounding the pump to filter liquid entering the pump, the sterilizing light being provided on a lower end of the first filter; and
      a second filter provided within the first filter and surrounding the pump.

2. The liquid dispenser of claim 1, wherein the main wall is made of transparent material.

3. The liquid dispenser of claim 1, wherein the main wall is inclined such that an angle between the main wall and a horizontal axis is between 70° and 80°.

4. A liquid dispenser, including:
   a tank having a wall defining a chamber in which liquid is stored;
   a pump provided in the tank to pump liquid in the chamber;
   a plate provided above the tank;
   a pipe connecting the pump to the plate to transfer liquid discharged from the pump to an upper surface of the plate;
   a UV light to emit UV light toward the wall; and
   a base provided below the wall to support the tank,
   wherein the wall is inclined inward from a bottom end to a top end,
   wherein the wall includes a main wall having a bottom end provided on the base and an upper end from which an upper wall extends,
   wherein an upper end of the upper wall includes an upper opening that is exposed when the plate is lifted away from the upper wall,
   wherein the main wall is transparent, and
   wherein the liquid dispenser further comprises a filter having a plurality of through-holes and surrounding the pump in the tank, wherein the UV light is provided on a lower end of the filter.

5. The liquid dispenser of claim 4, wherein the UV light is provided at a position that has a height at or below a midpoint height of the main wall.

6. The liquid dispenser of claim 4, wherein an angle between an inner surface of the main wall and a horizontal axis is between 70° and 80°.

7. The liquid dispenser of claim 4, further comprising a bottom plate defining a lower end of the chamber, wherein the bottom plate is made of metal, and the bottom plate is provided below the UV light.

8. A liquid dispenser, comprising:
   a tank;
   a pump to pump liquid stored in the tank;
   a pipe through which liquid discharged from the pump flows;
   a filter having a plurality of through-holes and surrounding the pump in the tank;
   a UV light provided on a lower end of the filter and emitting UV light toward the tank;
   a plate provided above the tank and supplied with liquid from the pipe,
   a base provided below the tank to support the tank, the base having an edge that is convexly curved;
   a base plate provided below the base to close a lower opening of the base; and
   a support formed on a bottom surface of the base plate to space the base plate apart from a surface on which the liquid dispenser is placed.

9. The liquid dispenser of claim 8, wherein the edge of the base forms a curved corner and is curved inward from a top end of the base toward the base plate.

10. The liquid dispenser of claim 8, wherein a radius of curvature of the edge of the base is 20 to 30 mm.

11. The liquid dispenser of claim 8, wherein at least one electronic device is provided in the base above the base plate and below the tank.

12. The liquid dispenser of claim 8, wherein a bottom surface of the support is made of a material configured to grip the surface on which the liquid dispenser is placed.

13. A liquid dispenser, comprising:
   a tank;
   a pump;
   a pipe coupled to the pump to transfer liquid discharged from the pump;
   a plate provided above the tank and having a hole communicating with the pipe such that an upper surface of the plate is supplied with liquid from the pipe via the hole;

a base provided below the tank to support the tank;
a first filter to filter the water introduced into the pump; and
a UV light provided on a lower end of the first filter to emit ultraviolet rays toward a side of the tank, wherein the side of the tank is inclined inward from a bottom end to a top end.

14. The liquid dispenser of claim 13, further including a bottom plate made of metal provided under the UV light.

15. The liquid dispenser of claim 13, further including a liquid guide provided below the plate to catch liquid falling off the plate and an illumination assembly provided between the liquid guide and the plate to support the plate above the liquid guide, wherein the plate and the liquid guide together close an upper opening of the tank when the liquid guide is inserted into the tank.

* * * * *